United States Patent
Arimoto et al.

(10) Patent No.: US 6,730,240 B2
(45) Date of Patent: May 4, 2004

(54) COLORED, TRANSPARENT FILM-FORMING COMPOSITION, ITS COATING METHOD AND REMOVING METHOD OF A FILM THEREOF

(75) Inventors: Kunio Arimoto, Kobe (JP); Chihito Tago, Kobe (JP); Hideo Nishida, Kobe (JP); Yasuhiro Maehara, Kobe (JP); Tatsuya Ohta, Ube (JP); Kazutoshi Yoshihara, Ube (JP); Satoshi Sawamura, Ube (JP)

(73) Assignees: Ishihara Chemical Co., Ltd., Kobe (JP); Sunshine Inc., Ube (JP)

( * ) Notice: Subject to any disclaimer, the term of this patent is extended or adjusted under 35 U.S.C. 154(b) by 0 days.

(21) Appl. No.: 09/761,988

(22) Filed: Jan. 16, 2001

(65) Prior Publication Data

US 2001/0031812 A1 Oct. 18, 2001

(30) Foreign Application Priority Data

Mar. 15, 2000 (JP) ........................................ 2000-118768

(51) Int. Cl.$^7$ ..................... C09K 13/00; C09K 13/06; C09K 3/00
(52) U.S. Cl. ................ 252/79.1; 252/79.4; 252/182.12; 428/447; 524/379
(58) Field of Search .............. 252/79.1, 79.4, 252/182.12; 428/447; 524/379, 309; 528/28; 216/53

(56) References Cited

U.S. PATENT DOCUMENTS

| | | | |
|---|---|---|---|
| 3,837,876 A | 9/1974 | Mayuzumi et al. ... | 106/287 SB |
| 5,063,114 A | * 11/1991 | Nambu et al. ............... | 428/447 |
| 5,866,262 A | 2/1999 | Galic et al. .................. | 428/447 |
| 5,925,285 A | * 7/1999 | Ramesh .................. | 252/182.28 |
| 5,973,068 A | * 10/1999 | Yamaya et al. .............. | 524/865 |
| 6,000,793 A | * 12/1999 | Inamoto ...................... | 347/101 |

FOREIGN PATENT DOCUMENTS

| | | | |
|---|---|---|---|
| EP | 0 090 481 | 10/1983 | |
| EP | 1134262 A2 | 9/2001 | ............ C09D/5/00 |
| JP | 55-025432 | 2/1980 | |
| JP | 2000-72485 | 3/2000 | |
| JP | 2000-191957 | 7/2000 | |

OTHER PUBLICATIONS

Lewis, Sr., Hawley's Condensed Chemical Dictionary, 13 th ed., John Wiley & Sons, Inc., USA, (1997), pp 71 and 816.*

* cited by examiner

Primary Examiner—Kin-Chan Chen
Assistant Examiner—Lynette T. Umez-Eronini
(74) Attorney, Agent, or Firm—Flynn, Thiel. Boutell & Tanis, P.C.

(57) ABSTRACT

A colored, transparent film-forming composition, which is made up of (a) a reaction product of an epoxy group-containing alkoxysilane (a-1) and an amino group-containing alkoxysilane (a-2) having active hydrogen therein, (b) an acid catalyst, (c) an alkali-soluble UV absorber, (d) at least one solvent selected from organic solvents having a boiling point of 100 to 250° C., and (e) a dye and/or a pigment, has a good coating performance and room temperature curing characteristic and can provide a film having good film strength and film removability after use. The coating method of the composition and the removing method of the film obtained from the composition are also described.

7 Claims, No Drawings

COLORED, TRANSPARENT FILM-FORMING COMPOSITION, ITS COATING METHOD AND REMOVING METHOD OF A FILM THEREOF

BACKGROUND OF THE INVENTION

1. Field of the Invention

This invention relates to a colored, transparent film-forming composition, which is applied onto a transparent substrate made, for example, of glass, plastics or the like and used as a window of buildings or a window of vehicles, including automobiles, thereby forming a uniform, clear, transparent colored film thereon. The invention also relates to a coating method of the composition and a method for removing or separating the resultant film. More particularly, the invention relates to a film-forming composition that is able to form a fashionable film on window glass of automotive vehicles and simultaneously serves to intercept UV light, and a coating method and removal method of a film obtained from the composition.

2. Description of the Prior Art

It is a usual practice to attach, on the window of buildings or automotive vehicles, a plastic film that is formulated with a UV absorber mainly for the purpose of absorbing UV light, or a coating formulated with a UV absorber.

However, the plastic film formulated with a UV absorber has the problems of the kind of color, the technique of attaching the film, and costs. In addition, further problems are involved in that it is troublesome to cut the film in a desired form with a difficulty in attaching to a complicated portion, air cells are apt to remain upon attachment of the film, and an adhesive is left after removal of the film, so that it has not been satisfactory for everyone to make ready use of it.

Where a film-forming composition containing a UV absorber is used, it is difficult to cure an applied film at room temperature, aside from color shading absorbed to the unevenness of coating, coupled with another deficiency that film strength after curing is low.

Further, a coated film, which is time-worn, has the vital drawback that it is difficult to remove or separate the coated film, and thus, a transparent substrate is very prone to be damaged on the surface thereof.

SUMMARY OF THE INVENTION

It is accordingly an object of the invention to provide a colored, transparent film-forming composition, which is easy to handle and can yield an attractive, fashionable, transparent, colored film article and the film can be simply removed or separated from a substrate.

It is another object of the invention to provide a method for coating such a composition as mentioned above and also a removal method of a film obtained from the composition.

It is a further object of the invention to provide a colored, transparent, film-forming composition, which has a good leveling property without causing coating irregularities and can be cured at room temperature, can provide a film that is free of color shading, is high in film strength after curing, and is readily removable or separable after having been used.

It is still a further object of the invention to provide a coating method of the composition mentioned above and also a removal method of the film obtained from the composition.

According to the invention, there is provided a colored transparent film-forming composition which comprises (a) a reaction product of an epoxy group-containing alkoxysilane (a-1) and an amino group-containing alkoxysilane having active hydrogen therein (a-2), (b) an acid catalyst, (c) an alkali-soluble UV absorber, (d) at least one solvent selected from organic solvents having a boiling point of 100 to 150° C., and (e) a dye and/or a pigment. We have found that this composition has a good property, a good room temperature-curing characteristic, a good film strength characteristic, and good film peelability.

PREFERRED EMBODIMENTS OF THE INVENTION

The component (a) used in the invention is a reaction product of an epoxy group-containing alkoxysilane (a-1) and an amino group-containing alkoxysilane having active hydrogen (a-2) therein. The epoxy group-containing alkoxysilane (a-1) that is one of the constituents of the component (a) includes, for example, γ-glycidoxypropyltrimethoxysilane, γ-glycidoxypropylmethyldimethoxysilane or the like.

The amino group-containing alkoxysilane having active hydrogen (a-2), which is the other constituent of the component (a) includes, for example, γ-aminopropyltriethoxysilane, N-(β-aminoethyl)-γ-aminopropyltrimethoxysilane, N-(β-aminoethyl-γ-aminopropylmethyldimethoxysilane and the like, of which N-(β-aminoethyl)-γ-aminopropyltrimethoxysilane of the formula, $H_2N(CH_2)_2NH(CH_2)_3Si(OMe)_3$, is preferably used.

When N-(β-aminoethyl)-γ-aminopropyltrimethoxysilane of the formula, $H_2N(CH_2)_2NH(CH_2)_3Si(OMe)_3$, exists as a constituent of the component (a), a hard film can be formed after curing and is suitable for application to automotive window glass. If the window is opened or closed, the film is unlikely to suffer scratches therein.

For the reaction between the constituents (a-1) and (a-2), the mixing ratio by weight between the epoxy group-containing alkoxysilane (a-1) and the amino group-containing alkoxysilane having active hydrogen (a-2) should preferably be 6:4 to 9:1.

More preferably, the ratio between (a-1) and (a-2) is in the range of 7:3 to 8:2.

When the ratio by weight of the epoxy group-containing alkoxysilane is larger than 9, curing of the resultant colored, transparent film-forming composition after coating proceeds slowly, with the surface hardness of the resultant film becoming low. On the other hand, when the ratio by weight of the amino group-containing alkoxysilane having active hydrogen is larger than 4, the film of the resulting colored-transparent film-forming composition exhibits poor weatherability.

The acid catalyst used in the practice of the invention may be any one, which acts as a catalyst when the hydroxyl group-containing hydrophilic alkoxysilane compound is hydrolyzed into a more reactive silanol at room temperature and subsequently undergoes polycondensation, e.g. sulfuric acid, nitric acid, phosphoric acid, para-toluenesulfonic acid and the like. Preferably, boron trifluoride is used.

The alkali-soluble UV absorber useful in the invention may be one selected from benzophenone compounds, benzotriazole compounds, and the like provided that they are alkali-soluble. Specific examples include 2,4-dihdyroxybenzophenone, 2,2', 4,4'-tetrahydroxybenzophenone, 2-hydroxy-4-methoxybenzophenone-5-sulfonic acid and the like.

The alkali-soluble UV absorber is present in an amount of 5 wt % to 40 wt % of the colored, transparent film-forming composition. If the amount of the UV absorber is less than 5 wt %, the UV absorbing effect is lessened along with poor film separability. If the UV absorber exceeds 40 wt %, not only waterproofing and a resistance to chemicals such as an oil film cleaner and the like are worsened, but also blooming undesirably occurs. From the standpoint of practical use, the amount preferably ranges from 15 wt % to 30 wt %.

The solvent used in the invention is made fundamentally of an alcohol solvent, a cellosolve solvent and a solvent having two or more functional groups, which, respectively, have a boiling point of 100 to 250° C. Typical examples include isobutyl alcohol, diethylene glycol diethyl ether, diisobutyl ketone, propylene glycol monoethyl ether acetate, dipropylene glycol monomethyl ether propanol and the like.

The propylene glycol monoethyl ether acetate includes 1-ethoxy-2-propyl acetate and 2-ethoxy-1-propylacetate, and it is preferred to use a mixture of not less than 90% of 1-ethoxy-2-propylacetate and not larger than 10% of 2-ethoxy-1-propylacetate.

The solvents used in the invention have a boiling point of 100 to 250° C. If the boiling point is lower than 100° C., the leveling property is worsened on coating, resulting in a poor film appearance. In contrast, when the boiling point exceeds 250° C., a coated film is unlikely to be dried.

Moreover, methyl alcohol, ethyl alcohol, methyl ethyl ketone or the like may be used in combination in order to increase solubilities of an acid catalyst and a dye.

The dyes and/or pigments used in the invention are selected from those having good weatherability for the purpose of coloring a film. Examples of the dye include direct dyes such as C.I. Direct Yellow 98, C.I. Direct Red 220, C.I. Direct Blue 77 and the like, and acid dyes such as C.I. Acid Yellow 112, C.I. Acid Red 256, C. I. Acid Blue 182 and the like. Examples of the pigment include inorganic pigments such as C.I. Pigment Yellow 157, C.I. Pigment Red 101, C.I. Pigment Blue 29 and the like, and organic pigments such as C.I. Pigment Yellow 154, C.I. Pigment Red 122, C.I. Pigment Blue 15:1 and the like. These dyes and/or pigments may be used singly or in combination. Moreover, fluorescent pigments for imparting a fluorescent color, light-storing pigments of the type wherein afterglow continues to the extent after light irradiation has stopped, iridescent pigments for imparting iridescence, temperature-indicating pigments capable of color change depending on an ambient temperature, hydrophilic pigments for imparting hydrophilicity, functional pigments for reflecting an IR ray (heat ray) and the like may be appropriately used depending on the purpose. Mention is made of a pigment made of an acrylic resin dissolving Acid Yellow 73 therein as an example of the fluorescent pigment, a pigment composed mainly of strontium aluminate as an example of the light storing pigment, a pigment composed mainly of titanium dioxide-coated mica as an example of the iridescent pigment, a pigment containing, in microcapsules, rhodamine B lactam/isocotyl galate/cetyl alcohol as an example of the temperature-indicating pigment, a pigment composed mainly of silica and titania as an example of the hydrophilic pigment, and ATO (antimony/tin oxides) ITO (indium/tin oxides) and the like fine powders as an example of the functional pigment for reflecting an IR ray (heat ray).

In the colored, transparent film-forming composition of the invention, it is preferred to further add (f) a stabilizer for an unpaired electron pair of a nitrogen atom and in order to inhibit the reaction with a UV absorber as will be caused by the unpaired electron pair of the nitrogen atom derived from an amino group-containing alkoxysilane having active hydrogen.

Various compounds may be mentioned as such a stabilizer (f), and salicylic acid, fumaric acid, crotonic acid, succinic acid, tartaric acid, para-hydroxybenzoic acid, pyrogallol, resorcinol and the like are preferably used.

These compounds used as (f) stabilizer may be used singly or in combination.

It is necessary that prior to coating onto a transparent substrate, an oil deposit or the like be removed from the surface of the transparent substrate such as of glass. Many methods of removing an oil film has been hitherto known, or which a method using a compound for oil film separation is preferred.

The colored, transparent film-forming composition of the invention can be applied by use of a brush, felt, non-woven fabric or the like.

For the coating, it is preferred to coat the composition in the direction of gravity so that an unevenness is unlikely to occur.

The colored, transparent film-forming composition of the invention is coated onto a transparent substrate, such as of glass, at room temperature, and drying to the touch is obtained within a range of from 0.5 hours to 2 hours. Further drying over 12 hours to 24 hours results in a transparent, hard, cured film of a beautiful color.

If the cured film, which is obtained by coating the colored, transparent film-forming composition of the invention onto a transparent substrate such as of glass, undergoes color degradation or is lowered in the effect of UV absorption, it is removed from the transparent substrate such as of glass and subjected to coating again.

In the practice of the invention, an alkaline detergent is used as a remover.

The alkaline agent should preferably have a pH of 9 or over. When the pH of the alkaline agent is smaller than 9, the solubility in the film is worsened. It will be noted that when the use of an alkaline agent alone does not permit infiltration into and cleaning of the film, an alkaline detergent is used wherein one or more nonionic surface active agents are formulated. Examples of the alkaline agent include anionic surface active agents, bicarbonates, sesqui-carbonates, carbonates, metasilicates, orthosilicates, phosphates, pyrophosphates, tripolyphosphates, metaborates, borates and the like in the form of sodium or potassium salts, and water-soluble amino alcohols such as triethanolamine, diethanolamine, monoethanolamine, methyldiethanolamine, ethyldiethanolamine, monoisopropanolamine, aqueous ammonia and the like. One or more of these compounds are appropriately dissolved in water and adjusted in pH to a level of 9 or over.

In addition, abrasives may be used in combination, and it is convenient to softly rub the surface with a piece of abrasive-attached sponge.

The embodiments of the invention may be summarized as follows:

(1) A colored, transparent film-forming composition comprising (a) a reaction product of an epoxy group-containing alkoxysilane (a-1) and an amino group-containing alkoxysilane having active hydrogen (a-2) therein, (b) an acid an acid catalyst, (c) an alkali-soluble UV absorber, (d) at least one solvent selected from organic solvents having a boiling point of 100 to 250° C., and (e) a dye and/or a pigment.

(2) A colored, transparent film-forming composition as recited in (1) above, wherein the reaction product is one which is obtained by reacting the epoxy group-containing alkoxysilane (a-1) and the amino group-containing alkoxysilane having active hydrogen (a-2) at a ratio of by weight of 6:4 to 9:1.

(3) A colored, transparent film-forming composition as recited in (1) or (2) above, wherein the amino group-containing alkoxysilane having active hydrogen (a-2) consists of N-(β-aminoethyl)-γ-aminopropyltrimethoxysilane.

(4) A colored, transparent film-forming composition as recited in any one of (1) to (3) above, wherein one or more of solvents selected from alcohol solvents, ketone solvents, ether solvents and solvents having two or more functional groups are used as an essential component.

(5) A colored, transparent film-forming composition as recited in any one of (1) to (4) above, further comprising, as (f) a stabilizer, one or more of organic compounds selected from salicylic acid, fumaric acid, crotonic acid, succinic acid, tartaric acid, parahydroxybenzoic acid, pyrogallol and resorcinol.

(6) A colored, transparent film-forming composition as recited in any one of (1) to (5) above, wherein the alkali-soluble UV absorber is used in an amount of 5 to 40 wt % of the film-forming component.

(7) A method for coating a colored, transparent film-forming composition as recited in any one of (1) to (6) above, which comprises storing (e) the dye and/or pigment component of the composition in a separate container, mixing the other components with the dye and/or pigment component immediately before the use of the composition to provide a mixed solution, impregnating the mixed solution in a coating applicator, and applying onto a pretreated transparent substrate in a direction of gravity.

(8) A method for removing a cured film comprising separating, after use, a colored film formed by curing a colored, transparent film-forming composition as recited in (1) to (6) above on a transparent substrate from the transparent substrate by use of an alkaline detergent.

The invention is described by way of examples.

EXAMPLE A

Preparation of a Colored Transparent Film-Forming Composition (A-1)

(1) 85 g of γ-glycidoxypropyltrimethoxysilane and 15 g of γ-aminopropyltriethoxysilane were mixed and agitated for 1 hour, followed by allowing to stand in a thermostatic chamber at 25° C. for 14 hours and thus aging, thereby obtaining 100 g of reaction product (I).

(2) 5 g of 2,4dihydroxybenzophenone was dissolved in 20 g of propylene glycol monoethyl ether acetate.

(3) 0.2 g of boron trifluoride piperidine was dissolved in 10 g of dipropylene glycol monomethyl ether propanol.

(4) The solution of (3) was mixed with the solution of (2), followed by further uniform mixing of 20 g of the solution of (1) to prepare solution A-1.

(A-2)

(5) 65 g of γ-glycidoxypropyltrimethoxysilane and 35 g of γ-aminopropyltriethoxysilane were mixed, followed by agitation and aging in the same manner as in (1) to obtain 100 g of reaction product (II).

(6) The solutions of (2) and (3) above were, respectively, prepared in the same manner as set out above, and the solution of (3) was mixed with the solution of (2), followed by further uniform mixing of 20 g of the solution of (5) to prepare solution A-2.

(A-3)

(7) 75 g of γ-glycidoxypropyltrimethoxysilane and 25 g of γ-aminopropyltriethoxysilane were mixed, followed by agitation and aging in the same manner as in (1) to obtain 100 g of reaction product (III).

(8) 5 g of 2,2', 4,4'-tetrahydroxybenzophenone was dissolved in 20 g of propylene glycol monoethyl ether acetate.

(9) The solution of (3) was prepared in the same manner as set out above and mixed with the solution of (9), followed by further uniform mixing of 20 g of the solution of (7) to prepare solution A-3.

(A-4)

(10) 75 g of γ-glycidoxypropyltrimethoxysilane and 25 g of γ-(2-aminoethyl)aminopropyltrimethoxysilane were mixed, followed by agitation and aging in the same manner as in (1) to obtain 100 g of reaction product (IV).

(11) The solution of (3) was prepared in a similar manner and mixed with the solution of (8), followed by further uniform mixing of 20 g of the solution of (1) to prepare solution A-4.

(A-5)

(12) The solutions of (2) and (3) were similarly prepared, and the solution of (3) was mixed with the solution of (2), followed by complete dissolution of 5 g of salicylic acid and further uniform mixing of 20 g of the solution of (5) to prepare solution A-5.

COMPARATIVE EXAMPLE

(13) 5 g of 2-hydroxy-4-methoxybenzophenone was dissolved in 20 g of propylene glycol monoethyl ether acetate.

(14) The solution of (3) was similarly prepared and mixed with the solution of (13), followed by uniform mixing of 20 g of the solution of (5) to prepare a reference solution.

Next, C.I. Pigment Yellow 154 was dispersed in dipropylene glycol monomethyl ether propanol in an amount of 1 wt % to obtain a colored solution. The colored solution was mixed with the solutions A-1 to A-5 and the reference solution at a ratio by weight of 1:1, respectively, thereby preparing colored, transparent film-forming compositions.

TABLE 1

|  |  | Component (a) | Component (b) | Component (c) | Component (d) | Component (e) | Component (f) |
|---|---|---|---|---|---|---|---|
| Example | A 1 | Reaction product (I) | BF piperidine | 2 4 dihydroxy benzo phenone | Dipropylene glycolmonomethyl ether propanol-propylene glycol monoethyl ether acetate | C I Pigment Yellow 154 | Not added |
|  | A 2 | Reaction product (II) | BF$_3$ piperidine | 2 4-dihydroxy benzo phenone | Dipropylene glycolmonomethyl ether propanol/propylene glycol monoethyl ether acetate | C I Pigment Yellow 154 | Not added |

TABLE 1-continued

|  | Component (a) | Component (b) | Component (c) | Component (d) | Component (e) | Component (f) |
|---|---|---|---|---|---|---|
| A 3 | Reaction product (III) | $BF_3$ piperidine | 2 2 4,4- tetra- hydroxy benzo- phenone | Dipropylene glycolmonomethyl ether propanol/propylene glycol monoethyl ether acetate | C I Pigment Yellow 154 | Not added |
| A 4 | Reaction product (IV) | $BF_2$ piperidine | 2 2 4 4- tetra- hydroxy benzo- phenone | Dipropylene glycolmonomethyl ether propanol/propylene glycol monoethyl ether acetate | C I Pigment Yellow 154 | Not added |
| A-5 | Reaction product (II) | $BF_3$ piperidine | 2,4- dihydroxy- benzo- phenone | Dipropylene glycolmonomethyl ether propanol/propylene glycol monoethyl ether acetate | C I Pigment Yellow 154 | Salicylic acid |
| Reference | Reaction product (II) | $BF_3$ piperidine | 2,4- dihydroxy- benzo- phenone | Dipropylene glycolmonomethyl ether propanol/propylene glycol monoethyl ether acetate | C I Pigment Yellow 154 | Not added |

EXAMPLE B

Coating of Colored Transparent Film-Forming Compounds and Curing of Films

An example of coating on window glass of an automobile is shown.

(Step of removing an oil film)

An oil film-removing compound is attached to a polishing sponge soaked with a small amount of water, with which the entire surface of the window glass is thoroughly polished. In order to confirm whether or not the oil film is completely removed, the glass is wholly wiped with the water-soaked sponge. Where water does not attach to the glass surface in the form of droplets, the oil film is left, so that the above procedure using the oil film-removing compound is repeated until the glass surface is fully wetted with water. After complete wiping-off of the water and compound, the window is entirely de-fatted with a non-woven fabric piece folded up several times and soaked with isopropyl alcohol.

(Coating step of colored, transparent film-forming composition)

About 8 ml of a solution of each colored, transparent film-forming composition prepared in Example A was placed in a tray (50×70 mm in width×15 mm in depth) having a capacity of 30 ml, and all the liquid in the tray was soaked in a piece of non-woven fabric folded up several times (5×30 mm in width×20 mm in thickness) at a coating side thereof (50 mm in width).

The holding side of the non-woven fabric piece (i.e. a side opposite to the coating side) is firmly held, after which the liquid soaked in the piece is gently coated down in the form of a band from the upper end at the right or left end of the window toward the lower end (in a direction of gravity). After arrival at the lower end, the procedure of coating in the form of a strip from the upper to lower end (in a direction of gravity) is repeated so that the strips are superposed by about 1/3 to 1/4 thereof, thereby uniformly coating the whole of the window.

(Drying step)

After the coating, the window is allowed to stand in a place where water is not splashed on and dust is reduced in amount and is thus naturally dried. Usually, it takes 30 minutes in summer and 2 hours or below in winter before drying to such an extent that the liquid is not attached to the finger on contact with the coated surface (drying to the touch). Thereafter, the drying is continued by allowing to stand over about 24 hours to ensure substantially a complete drying state wherein the film is cured to an extent of suffering few defects when the window is opened or closed.

(Dry-to-the-touch time)

Based on the method of JIS K 5400, the dry-to-the-touch time was measured. (Measured at intervals of 10 minutes at 25° C. in summer and at 10° C. in winter.)

After the coating, the film state after passage over 72 hours was assessed in the following manner.

(Transparency)

Assessed through visual observation based on the method of JIS K 5400.

(Unevenness of coating)

Assessed through visual observation based on the method of JIS K 5400.

(Film hardness)

The film hardness was assessed according to a pencil scratching method based on JIS K 5400.

Each colored, transparent film-forming composition prepared in Example A was coated and dried on a glass test sheet (70 mm×110 mm in width×5 mm in thickness) in the same manner as in the procedure of coating on the automotive window glass. After the coating, the test sheet was naturally dried over 24 hours and subjected to measurement of a UV transmittance in the following manner.

(UV transmittance)

The measurement was conducted by use of a spectrophotometer wherein a UV transmittance at a wavelength of 345 nm was evaluated.

Moreover, the test sheet was set in an accelerated light fastness tester (prescribed in JIS B 7754), and was again subjected to similar measurement of UV transmittance after passage of 192 hours.

It was revealed that the compositions of Examples A-1 to A-5 exhibited initial UV transmittances lower than the reference, with the UV transmittance being low after the accelerated light fastness test, thus ensuring an excellent UV-absorbing effect which continued over a long time.

These results are shown in Table 2 below.

|  |  | Dry-to-the-touch time | Trans-parency | Uneveness of Coating | Film hardness | UV trans-mittance (after 24 hours) | UV trans-mittance (192 hours after weatherability test) |
|---|---|---|---|---|---|---|---|
| Example | A-1 | Summer (25° C.) 40 minutes | good | no | H | 5% | 20% |
|  |  | Winter (10° C.) 90 minutes | good | no | H | 5% | 20% |
|  | A-2 | Summer (25° C.) 30 minutes | good | no | 2H | 10% | 35% |
|  |  | Winter (10° C.) 80 minutes | good | no | 2H | 10% | 35% |
|  | A-3 | Summer (25° C.) 30 minutes | good | no | 2H | 0% | 10% |
|  |  | Winter (10° C.) 80 minutes | good | no | 2H | 0% | 10% |
|  | A-4 | Summer (25° C.) 30 minutes | good | no | 3H | 0% | 15% |
|  |  | Winter (10° C.) 80 minutes | good | no | 3H | 0% | 15% |
|  | A-5 | Summer (25° C.) 40 minutes | good | no | 2H | 0% | 10% |
|  |  | Winter (10° C.) 80 minutes | good | no | 2H | 0% | 10% |
| Reference |  | Summer (25° C.) 30 minutes | good | no | 2H | 30% | 90% |
|  |  | Winter (10° C.) 80 minutes | good | no | 2H | 30% | 90% |

EXAMPLE C

Removal of Cured Film

The cured film obtained by coating each colored, transparent film-forming composition prepared in Example A on the window glass of the actual car in Example B was subjected to outdoor exposure over 3 months (June to August in summer and December to February in winter). Thereafter, the film surface was softly rubbed with a sponge piece soaked with an anionic surface active agent (i.e. an oleic acid triethanolamine aqueous solution/pH=9) provided as alkali detergent I, and the removability of the film of each sample was assessed on the basis of the following standards.

Further, an alkaline abrasive composition (pH=10, pasty composition) provided an alkali detergent II wherein an anionic surface active agent (oleic acid morpholine) was used, in which a petroleum solvent and calcined diatomaceous earth serving as an abrasive are, respectively, emulsified and dispersed, was prepared, and the film surface was softly rubbed with a sponge piece soaked with this solution and evaluated in a similar way.

⊚: excellent (quickly, completely removed)
○: good (completely removed)
Δ: slightly bad (not removed partially)
×: bad (not removed)

It has been found that Examples A-1 to A-5 were superior in removability of the cured films to the reference. The results are shown in Table 3.

TABLE 3

|  | Period of outdoor exposure | Alkali detergent I | Alkali detergent II |
|---|---|---|---|
| Example |  |  |  |
| A - 1 | 3 months in summer | ○ - Δ | ○ |
|  | 3 months in winter | ○ - Δ | ○ |
| A - 2 | 3 months in summer | ○ - Δ | ○ |
|  | 3 months in winter | ○ - Δ | ○ |
| A - 3 | 3 months in summer | ○ | ⊚ |
|  | 3 months in winter | ○ | ⊚ |
| A - 4 | 3 months in summer | ○ | ⊚ |
|  | 3 months in winter | ○ | ⊚ |
| A - 5 | 3 months in summer | ⊚ | ⊚ |
|  | 3 months in winter | ⊚ | ⊚ |
| Reference | 3 months in summer | X | X |
|  | 3 months in winter | X | X |

As will be seen from the results of Tables 2 and 3, according to the invention, there can be obtained a colored, transparent film-forming composition that is free of unevenness of coating and color shading and can be cured at room temperature and that can form an attractive, transparent, UV-absorbing, colored film having a high film hardness after curing. In addition, after use, the film can be readily removed in a simple manner.

What is claimed is:
1. A colored, transparent film-forming composition consisting of (a) a reaction product of an epoxy group-containing alkoxysilane (a-1) selected from the group consisting of γ-glycidoxypropyltrimethoxysilane,

γ-glycidoxypropylmethyldimethoxysilane and γ-glycidoxypropyltriethoxysilane and an amino group-containing alkoxysilane (a-2) selected from the group consisting of γ-aminopropyltrimethoxysilane, γ-aminopropyltriethoxysilane, N-(β-aminoethyl)-γ-aminopropyltrimethoxysilane, N-(β-aminoethyl)-γ-aminopropylmethyldimethoxysilane and N-(β-aminoethyl)-γ-aminopropyltriethoxysilane, (a-2) having active hydrogen therein and the weight ratio of (a-1) to (a-2) in the reaction is 6:4 to 9:1, (b) an acid catalyst, (c) an alkali-soluble UV absorber, (d) at least one organic solvent having a boiling point of 100 to 250° C., (e) a dye and/or a pigment and, optionally, (f) a stabilizer selected from the group consisting of salicyclic acid, fumaric acid, crotonic acid, succinic acid, tartaric acid, and mixtures thereof.

2. The colored, transparent film-forming composition according to claim 1, wherein the amino group-containing alkoxysilane (a-2) consists of N-(β-aminoethyl)-γ-aminopropyltrimethoxysilane.

3. A colored, transparent film-forming composition according to claim 1, wherein said at least one solvent is one or more members selected from the group consisting of alcohol solvents, ketone solvents, ether solvents and solvents being two or more functional groups.

4. A colored, transparent film-forming composition according to claim 1, further containing (f) a stabilizer selected from the group consisting of salicyclic acid, fumaric acid, crotonic acid, succinic acid, tartaric acid and mixtures thereof.

5. A colored, transparent film-forming composition according to claim 1, wherein said alkali-soluble UV absorber is present in an amount of 5 to 40 wt % based on the film-forming components.

6. The colored, transparent film-forming composition according to claim 1, wherein the amino group-containing alkoxysilane (a-2) is one or more members selected from the group consisting of N-(β-aminoethyl)-γ-aminopropyltrimethoxysilane and N-(β-aminoethyl-γ-aminopropylmethyldimethoxysilane.

7. The colored, transparent film-forming composition according to claim 6, wherein the epoxy group-containing alkoxysilane (a-1) is one or more members selected from the group consisting of γ-glycidoxypropyltrimethoxysilane and γ-glycidoxypropylmethyldimethoxysilane.

* * * * *